(12) United States Patent
Moers

(10) Patent No.: US 11,608,885 B2
(45) Date of Patent: Mar. 21, 2023

(54) PLANET CARRIER WITH FLEXIBLE BOLT AND STIFFENING RIB

(71) Applicants: ZF Friedrichshafen AG, Friedrichshafen (DE); ZF Wind Power Antwerpen N.V., Lommel (BE)

(72) Inventor: Sven Moers, Westerlo (BE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 0 days.

(21) Appl. No.: 17/610,465

(22) PCT Filed: Mar. 5, 2020

(86) PCT No.: PCT/EP2020/055763
§ 371 (c)(1),
(2) Date: Nov. 11, 2021

(87) PCT Pub. No.: WO2020/229008
PCT Pub. Date: Nov. 19, 2020

(65) Prior Publication Data
US 2022/0228659 A1  Jul. 21, 2022

(30) Foreign Application Priority Data
May 16, 2019 (DE) .................... 10 2019 207 100.7

(51) Int. Cl.
*F16H 1/28* (2006.01)
*F16H 57/08* (2006.01)

(52) U.S. Cl.
CPC ..... *F16H 57/082* (2013.01); *F16H 2057/085* (2013.01)

(58) Field of Classification Search
CPC . F16H 57/082; F16H 2057/085; F16H 1/2836
See application file for complete search history.

(56) References Cited

U.S. PATENT DOCUMENTS 3,303,713 A * 2/1967 Hicks ........................ F16H 1/22
74/411
4,700,583 A * 10/1987 Hicks .................... F16H 57/082
74/411

(Continued)

FOREIGN PATENT DOCUMENTS

CN 203258045 U 10/2013
CN 103511606 A 1/2014
(Continued)

*Primary Examiner* — Justin Holmes
(74) *Attorney, Agent, or Firm* — Leydig, Voit & Mayer, Ltd.

(57) ABSTRACT

An arrangement includes a planet carrier. The planet carrier includes a web, a journal and a bushing. A first end of the journal is fixed in the web, at least a part of the journal projects into the bushing, and a second end of the journal is fixed in the bushing. The planet carrier further includes a stiffening element, an annular support ring, and a cap placed onto a first axial end of the bushing. An axis of symmetry of the annular support ring coincides with a center axis or axis of rotation of the planet carrier. The stiffening element is fixed in the bushing and in the support ring. The bushing and the stiffening element are connected to each other as two pieces. The stiffening element is joined to the cap.

4 Claims, 1 Drawing Sheet

(56) References Cited

U.S. PATENT DOCUMENTS

| | | | |
|---|---|---|---|
| 8,920,284 B2* | 12/2014 | Fox | F16C 43/04 |
| | | | 475/346 |
| 10,682,705 B2* | 6/2020 | Nies | B22F 5/10 |
| 11,073,193 B2 | 7/2021 | Smook | |
| 2010/0197444 A1* | 8/2010 | Montestruc | F16H 1/2836 |
| | | | 475/331 |
| 2019/0136945 A1 | 5/2019 | Nies et al. | |

FOREIGN PATENT DOCUMENTS

| | | |
|---|---|---|
| DE | 1500451 A1 | 5/1969 |
| DE | 102017219614 A1 | 5/2019 |
| EP | 0003894 A1 | 9/1979 |
| EP | 0054280 A1 | 6/1982 |
| WO | WO 2007007049 A1 | 1/2007 |

* cited by examiner

PLANET CARRIER WITH FLEXIBLE BOLT AND STIFFENING RIB

CROSS REFERENCE TO RELATED APPLICATIONS

This application is a U.S. National Phase application under 35 U.S.C. § 371 of International Application No. PCT/EP2020/055763, filed on Mar. 5, 2020, and claims benefit to German Patent Application No. DE 10 2019 207 100.7, filed on May 16, 2019. The International Application was published in German on Nov. 19, 2020 as WO 2020/229008 A1 under PCT Article 21(2).

FIELD

The disclosure relates to an arrangement including a planet carrier having a web, a journal, and a bushing, wherein a first end of the journal is fixed in the web, at least a part of the journal projects into the bushing, and a second end of the jourcal is fixed in the bushing.

BACKGROUND

So-called flex pins are known from the prior art. Flex pins are described, for example, in the published patent application DE 1 500 451 A1. A flex pin is a flexible journal on which a bushing is mounted. A planet gear is rotatably mounted on the bushing. Should the journal deform, this is compensated by tilting the bushing. The deformability of the journal results in load balancing in the planetary stage.

In the case of helical-toothed planetary stages, axially directed forces occur in the tooth engagements. The axial force in a the tooth engagement of a planet gear with a sun gear is opposed to the axial force in the tooth engagement of the planet gear with a ring gear. As a result, a tilting moment acts on the planet gear. This tilting moment would lead to unwanted deformations in a flex pin. It is therefore difficult to provide a helical-toothed planetary stage with flex pins. Straight-toothed gears, however, lead to increased noise emissions.

SUMMARY

In an embodiment, the present disclosure provides an arrangement including a planet carrier. The planet carrier includes a web, a journal and a bushing. A first end of the journal is fixed in the web, at least a part of the journal projects into the bushing, and a second end of the journal is fixed in the bushing. The planet carrier further includes a stiffening element, an annular support ring, and a cap placed onto a first axial end of the bushing. An axis of symmetry of the annular support ring coincides with a center axis or axis of rotation of the planet carrier. The stiffening element is fixed in the bushing and in the support ring. The bushing and the stiffening element are connected to each other as two pieces. The stiffening element is joined to the cap.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 2:
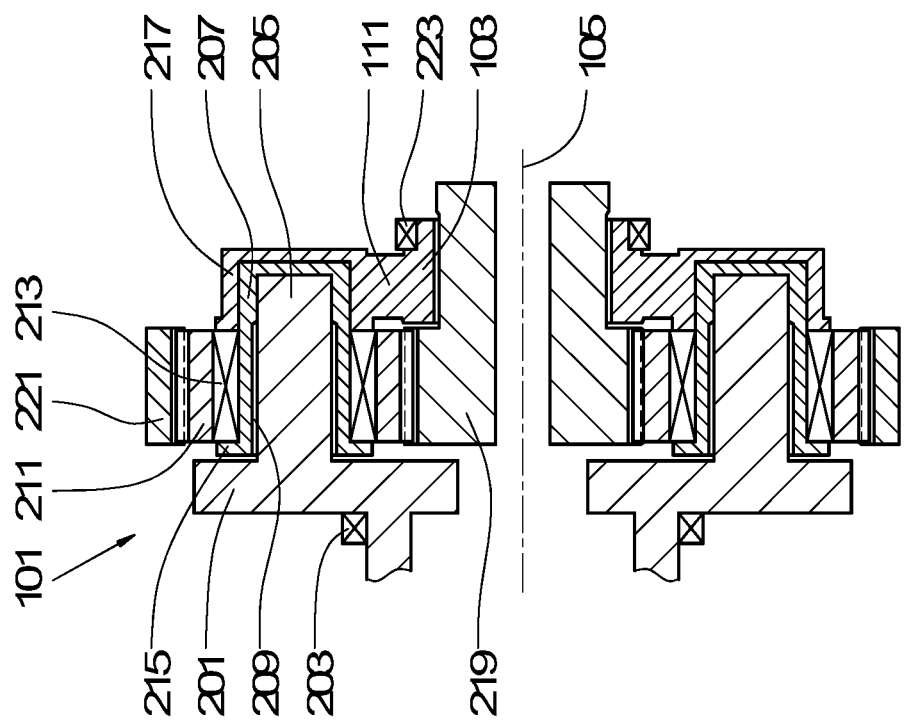
FIG. 2 shows a sectional view of the planet carrier.

The present disclosure provides for eliminating disadvantages of solutions known from the prior art. In particular, the present disclosure provides for load balancing in a planetary stage without increasing the noise emissions.

The present disclosure provides an arrangement that comprises a planet carrier having at least one web. A web is a supporting structure in which planet bolts are fixed. A rotatable planet carrier is usually mounted rotatably with the web in a rotationally fixed structure, for example a gear housing.

The planet bolts of the planet carrier are formed in each case by a journal and a bushing. Accordingly, the arrangement comprises at least one journal and at least one bushing.

A bushing is a rotationally symmetrical body with at least one cavity. The cavity and the body are rotationally symmetrical with respect to a common axis. Furthermore, the cavity is open, i.e. has at least one opening. The opening is rotationally symmetrical with respect to the same axis. In particular, at least a part of the bushing can take the form of a hollow cylinder.

The bushing and the journal together form a planet bolt. The bushing is used to hold at least one planet gear. The planet gear is provided to be mounted rotatably in the bushing. An axis of rotation of the planet gear corresponds to the axis of symmetry of the bushing. The bushing forms either an inner ring of a bearing with which the planet gear is mounted in the bushing or a bearing seat on which an inner ring of the bearing can be fixed. Accordingly, a part of the surface of the bushing preferably takes the form of a lateral surface of a straight circular cylinder.

In addition to the bushing, the journal is preferably also rotationally symmetrical with respect to the axis of rotation of the planet gear.

The journal has two axial ends: a first end and a second end. In particular, the journal consists of three pieces: the first end, the second end and an intermediate piece. The first end and the second end are axially spaced from one another. The intermediate piece connecting the two ends to each other is located between the first end and the second end. In particular, the intermediate piece can be located between a first and a second plane which run radially, i.e., are oriented orthogonally to the axis of rotation of the planet gear. The first end of the journal and the intermediate piece are then located on different sides of the first plane. Accordingly, the second end of the journal and the intermediate piece are located on different sides of the second plane.

The first end of the journal is fixed in the web. The fixing is preferably rigid, i.e., designed in such a way that the first end of the journal is immovable relative to the first web. In particular, the journal can be connected integrally to the web in its first end.

At least a part of the journal projects into the bushing or into the cavity formed by the bushing. Conversely, this means that at least a part of the bushing surrounds the journal in the circumferential direction. The part of the journal projecting into the bushing comprises the second end of the journal. In particular, the second end of the journal is thus located in the bushing or in the cavity.

The second end of the journal is fixed in the bushing. The fixing is preferably rigid, i.e., such that the second end of the journal is immovable relative to the part of the bushing in which the second end is fixed. Between the second end of the journal and the bushing, there can be an interlocking and/or frictional connection, for example. The second end of the journal and the bushing are preferably connected to one another as two pieces. In this case, the second end of the journal and the bushing form two physically separate pieces.

An intermediate space remains between the journal and the bushing. The intermediate space extends completely around the axis of rotation of the planet gear. It is a part of the cavity of the bushing that is not filled by the journal. The intermediate space is preferably rotationally symmetrical to the axis of rotation of the planet gear. This is equivalent to the fact that the at least one part of the journal is axially centered in the bushing.

Preferably, at least a part of the intermediate space is arranged axially between the web or the region of the web in which the first end of the journal is fixed and the region of the bushing in which the second end of the journal is fixed.

The intermediate space is filled with a resilient medium. In particular, the medium can be a fluid, such as lubricant and/or air.

By means of the described arrangement, a first axial end of the bushing is cantilevered. This means that the first axial end of the bushing is supported exclusively by adjoining parts of the bushing. There is no joining connection between the first axial end of the bushing and means which do not belong to the bushing.

Since the first axial end of the bushing is cantilevered, it can be moved in the axial direction relative to the journal. A corresponding movement is accompanied by an elastic deformation of the journal. The planet bolt formed by the journal and the bushing thus has the deformation properties of a flex pin.

According to the present disclosure, the planet carrier has at least one stiffening element and a support ring. The stiffening element is used to stiffen the bushing. For this purpose, it is fixed in the bushing and in the support ring and thus forms a stiffening connection of the bushing to the support ring. Forces are supported by the bushing in the support ring via the stiffening element.

The stiffening element is preferably fixed in a second axial end of the bushing. The first axial end and the second axial end of the bushing are axially spaced from each other. Between the first axial end and the second axial end is located an intermediate piece which connects the two axial ends to each other. The bushing consists of three pieces: the first axial end, the second axial end and the intermediate piece. In particular, the intermediate piece can be located between a third and a fourth plane which run radially, i.e., are oriented orthogonally to the axis of rotation of the planet gear. The first axial end of the bushing and the intermediate piece are located on different sides of the third plane. Accordingly, the second axial end of the bushing and the intermediate piece are located on different sides of the fourth plane.

The stiffening element is preferably fixed integrally in the bushing and/or in the support ring. In particular, the bushing, the stiffening element, and the support ring can be integrally connected to one another. In this case, a single piece forms the bushing, the stiffening element and the support ring.

The stiffening element preferably stiffens the bushing in relation to a tilting about an axis running tangentially with respect to an axis of rotation or center axis of the planet carrier. This axis intersects the axis of rotation of the planet gear at right angles and is oriented tangentially to a circle which runs completely in a plane oriented orthogonally to the axis of rotation or center axis of the planet carrier and whose center point lies on the axis of rotation or center axis of the planet carrier. In particular, the stiffening element can be a rib which runs radially with respect to the axis of rotation or center axis of the planet carrier.

The support ring preferably extends annularly. This means that it has the basic shape of a ring. A ring is a toroid. Its axis of symmetry preferably coincides with the center axis or the axis of rotation of the planet carrier.

The basic shape of a geometric body denotes the shape of an original body from which the first-mentioned body is produced by eliminating individual areas, for example by inserting recesses, and/or by adding individual areas.

The bushing is partially stiffened by the stiffening element. This makes it possible to simply use helical teeth in the planetary stage. A tilting moment, which arises from axially acting forces in the tooth engagements, is countered by the stiffening element, while the bushing remains resilient with respect to forces acting in the circumferential direction. As in the case of a flex pin, load balancing in the tooth engagements of the planetary stage can thereby take place.

The stiffening element preferably extends radially outward from the support ring with respect to the axis of rotation or center axis of the planet carrier. Conversely, this means that it extends radially inward from the bushing with respect to the axis of rotation or center axis of the planet carrier. The bushing is thus arranged radially further outwardly than the support ring with respect to the axis of rotation or center axis of the planet carrier. A distance of the bushing, at a point closest to the axis of rotation or center axis of the planet carrier, from the axis of rotation or center axis of the planet carrier is greater than a distance of the support ring, at a point furthest away from the axis of rotation or center axis of the planet carrier, from the axis of rotation or center axis of the planet carrier. In particular, the bushing can be arranged outside a straight circular cylinder, the center axis of which is identical to the axis of rotation or center axis of the planet carrier, while the support ring is located in its interior.

The bushing and the stiffening element are connected to each other as two pieces. The bushing and the stiffening element thus form two physically separate pieces. This enables a simple construction of the planetary stage, ensuring ease of assembly.

The stiffening element can be joined directly to the bushing. Alternatively, in a preferred development, a cap mounted on the first axial end of the bushing is provided. The cap is preferably rotationally symmetrical with respect to the axis of rotation of the planet gear. The cap encloses the first axial end of the bushing. Conversely, the first axial end is located inside the cap. This results in an interlocking connection between the bushing and the cap. In addition, the cap is preferably frictionally connected to the bushing in order to prevent the bushing from slipping out of the cap.

According to the development, the stiffening element is joined directly to the cap. Fixing between the stiffening element and the bushing is thus achieved via the cap.

The cap is used not only to fix the stiffening element, but also forms a bearing seat together with the bushing. In particular, the bushing and the cap can each have a collar, which is used as axial fixing for at least one bearing with which a planet gear is mounted on the planet bolt.

In a corresponding preferred development, the bushing and the cap each form a surface extending axially with respect to the axis of rotation of the planet gear. The two surfaces face each other and form either contact surfaces for supporting the planet bearing in the axial direction or sliding surfaces of the planet bearing.

In a preferred development, the support ring is free-floating. This means that the support ring does not have a bearing but is mounted exclusively via the planet carrier and the at least one journal.

Alternatively, in a likewise preferred development, the support ring forms at least one bearing seat for a bearing and/or a running surface of a bearing. The bearing is used to mount the support ring.

Figure 1:
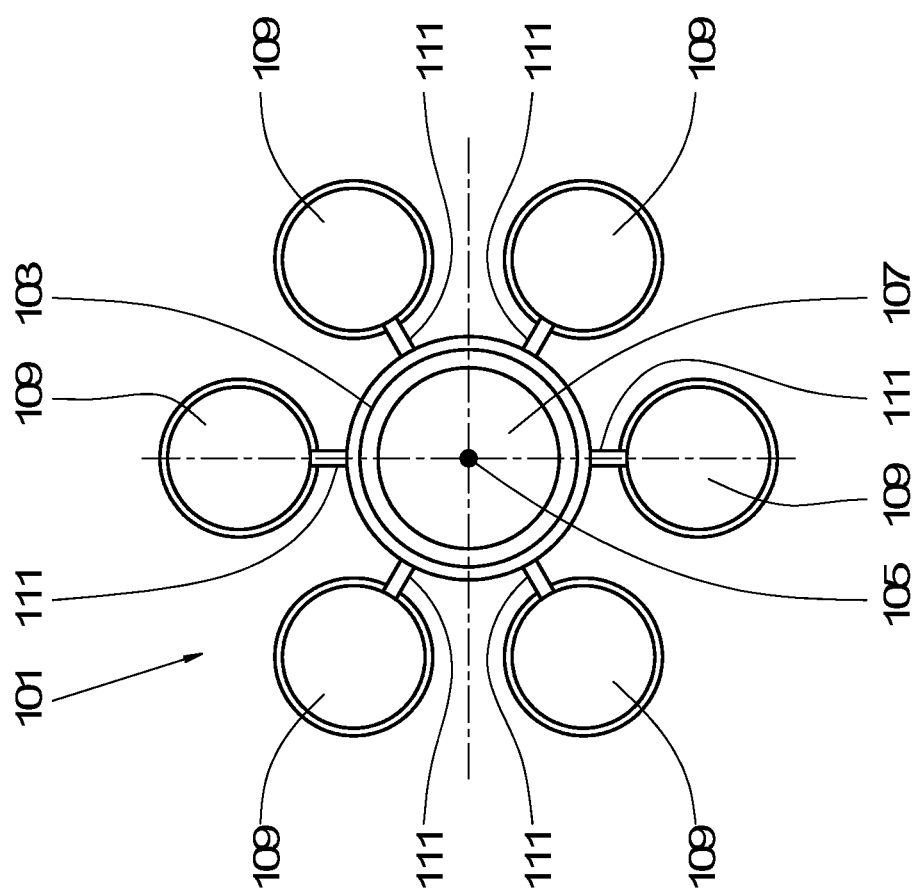
FIG. 1 shows an axial view of a planet carrier.

It can be seen in FIG. 1 that the planet carrier 101 has a support ring 103. The support ring 103 is rotationally symmetrical to an axis of rotation 105 of the planet carrier 103. It surrounds a cavity 107 through which the axis of rotation 105 runs.

The planet carrier 101 also has caps 109 arranged in a star shape. Starting from the support ring 103, the caps 109 are arranged radially further outward than the axis of rotation 105.

A stiffening rib 111 extends in each case between a cap 109 and the support ring 103. The ribs 111 are planar elements, the extension of which in the axial direction with respect to the axis of rotation 105 is greater than their thickness, i.e., their extension orthogonally thereto. The thickness of the ribs 111 is preferably the same at every point. In each cross-section, i.e., in each section extending orthogonally to the axis of rotation 105, the ribs 111 have a rectangular shape. In particular, the shape can be constant in any cross-section.

FIG. 2 shows a longitudinal section of the planet carrier 101. As can be seen here, the planet carrier 101 has exactly one web 201. Located in the web 201 is a first bearing 203 with which the planet carrier 101 is mounted rotatably about the axis of rotation 105.

Journals 205 project from the web 201 in the axial direction. The journals 205 are integrally connected to the web 201. They each have the shape of a straight circular cylinder.

A bushing 207 is fixed to each of the journals 205. Fixing takes place only at one end. Toward the other end, an intermediate space 209 extends in each case between a bushing 207 and a journal 205. The intermediate space 209 allows tilting of the bushing 207 relative to the journal 205. Together with a twisting of the journal 205, a displacement, i.e. a translational change in position, of the bushing 207 results. As a result of this change in position, the position of a planet gear 211, which is rotatably mounted on the bushing 207 by means of bearings 213, can be varied.

The bearings 213 are axially fixed between a collar 215 of the bushing 207 and a cap 217. The cap 217 is placed on the bushing 207.

The planet gear 211 meshes with a sun gear 219 and a ring gear 221. If the planet gear 211, the sun gear 219, and the ring gear 221 are helical-toothed, forces will be generated in opposite axial directions in the tooth engagement of the planet gear 211 and the sun gear 219 and in the tooth engagement of the planet gear 211 and the ring gear 221. The tilting moment occurring as a result is countered by the stiffening rib 111 and the support ring 103.

The support ring 103 can be free-floating or, as shown in FIG. 2, can be mounted in a gear housing by means of a second bearing 223.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

101 Planet carrier
103 Support ring
105 Axis of rotation
107 Cavity
109 Cap
111 Stiffening rib
201 Web
205 Journal
207 Bushing
209 Intermediate space
211 Planet gear
213 Bearing
215 Collar
217 Cap
219 Sun gear
221 Ring gear
223 Bearing

The invention claimed is:

1. An arrangement comprising:
   a planet carrier including a web, a journal and a bushing, wherein a first end of the journal is fixed in the web, at least a part of the journal projects into the bushing, and a second end of the journal is fixed in the bushing,
   wherein the planet carrier further includes a stiffening element, an annular support ring, and a cap placed onto a first axial end of the bushing,
   wherein an axis of symmetry of the annular support ring coincides with a center axis or axis of rotation of the planet carrier,
   wherein the stiffening element is fixed in the bushing and in the support ring,
   wherein the bushing and the stiffening element are connected to each other as two pieces, and
   wherein the stiffening element is joined to the cap.

2. The arrangement according to claim 1, wherein the bushing forms a first radially extending surface, and the cap forms a second radially extending surface.

3. The arrangement according to claim 1, wherein the support ring is free-floating.

4. The arrangement according to claim 1, wherein the support ring forms at least one bearing seat and/or a running surface of a bearing.

\* \* \* \* \*